(12) United States Patent
Fourney et al.

(10) Patent No.: US 12,371,280 B2
(45) Date of Patent: Jul. 29, 2025

(54) HINGED MAGNETIC MOVER FOR A MAGNETIC LEVITATION CONVEYOR

(71) Applicant: Laitram, L.L.C., Harahan, LA (US)

(72) Inventors: Matthew L. Fourney, Laurel, MD (US); Bryant G. Ragan, Metairie, LA (US)

(73) Assignee: Laitram, L.L.C., Harahan, LA (US)

( * ) Notice: Subject to any disclaimer, the term of this patent is extended or adjusted under 35 U.S.C. 154(b) by 56 days.

(21) Appl. No.: 18/270,612

(22) PCT Filed: Feb. 7, 2022

(86) PCT No.: PCT/US2022/015426
§ 371 (c)(1),
(2) Date: Jun. 30, 2023

(87) PCT Pub. No.: WO2022/177768
PCT Pub. Date: Aug. 25, 2022

(65) Prior Publication Data
US 2024/0059505 A1    Feb. 22, 2024

Related U.S. Application Data

(60) Provisional application No. 63/150,657, filed on Feb. 18, 2021.

(51) Int. Cl.
*B65G 54/02* (2006.01)
*B65G 17/06* (2006.01)
*B65G 17/46* (2006.01)
*B65G 45/18* (2006.01)
*B65G 45/22* (2006.01)

(52) U.S. Cl.
CPC ............ *B65G 54/02* (2013.01); *B65G 17/46* (2013.01); *B65G 45/18* (2013.01); *B65G 45/22* (2013.01); *B65G 17/06* (2013.01)

(58) Field of Classification Search
CPC ........ B65G 45/22; B65G 45/18; B65G 54/02; B65G 17/46; B65G 17/06
USPC ....................................... 198/850, 851, 853
See application file for complete search history.

(56) References Cited

U.S. PATENT DOCUMENTS

| | | | | |
|---|---|---|---|---|
| 3,827,071 | A * | 7/1974 | Turpin | G03B 33/00 355/71 |
| 4,586,601 | A * | 5/1986 | Hodlewsky | B65G 17/46 198/690.1 |
| 5,375,531 | A | 12/1994 | Ogihara et al. | |
| 8,434,613 | B2 * | 5/2013 | Ozaki | B65G 23/18 198/690.1 |
| 8,863,943 | B2 * | 10/2014 | Miyashita | B65G 15/32 198/853 |
| 8,967,051 | B2 | 3/2015 | King et al. | |

(Continued)

FOREIGN PATENT DOCUMENTS

| | | | | |
|---|---|---|---|---|
| DE | 202017103834 U1 * | 11/2018 | ............ | B65G 17/46 |
| WO | WO-2012102857 A1 * | 8/2012 | ............ | B65G 15/30 |

*Primary Examiner* — James R Bidwell
(74) *Attorney, Agent, or Firm* — Catherine M. Bishop

(57) ABSTRACT

A hinged magnetic mover for conveying product comprises a plurality of hingedly connected modules including magnets. The magnets form an array of X magnets alternating with Y magnets. A carryway for the hinged magnetic mover forms a stator comprising XY coils with Hall sensors for interacting with the magnets to induce a motive force on the mover.

19 Claims, 9 Drawing Sheets

(56) References Cited

U.S. PATENT DOCUMENTS

| | | |
|---|---|---|
| 9,802,507 B2 | 10/2017 | Clark et al. |
| 10,173,848 B2 | 1/2019 | Wipf |
| 10,654,660 B2 | 5/2020 | Ragan et al. |
| 10,807,803 B2 | 10/2020 | Ragan et al. |
| 2011/0062001 A1* | 3/2011 | Garbagnati .......... B65G 17/086 198/851 |
| 2013/0306445 A1* | 11/2013 | Bogle .................... B65G 15/30 198/850 |

* cited by examiner

HINGED MAGNETIC MOVER FOR A MAGNETIC LEVITATION CONVEYOR

RELATED APPLICATIONS

The present invention claims priority to U.S. Provisional Patent Application No. 63/150,657, filed Feb. 18, 2021, and entitled "Hinged Magnetic Mover for a Magnetic Levitation Conveyor", the contents of which are herein incorporated by reference.

BACKGROUND

The invention relates generally to a magnetic levitation conveyors and more particularly to a mover in a magnetic levitation conveyor.

Magnetic levitation conveyors use magnetic levitation (MagLev) to accurately position and—or move products. These conveyors incorporate an article-transporting mover with magnets and a stator with coils propagating an electromagnetic wave to both propel and levitate the mover. A drawback of currently available magnetic levitation conveyors is the difficulty in transferring conveyed product to and from the movers. Many solutions involve robots or other manipulators to "pick and place" the product. These solutions are expensive and inherently low throughput. In addition, rigid movers also are not easily transferred from one elevation to another.

SUMMARY

A mover for a magnetic levitation conveyor comprises a plurality of hingedly connected modules including an array of magnets. The array of magnets comprises X magnets alternating with Y magnets. A carryway for the hinged magnetic mover forms a stator comprising XY coils with Hall sensors for interacting with the magnets to induce a motive force on the mover.

According to one aspect, a module for a forming a magnetic mover in a magnetic levitation system comprises a body, a first set of hinge elements extending from the first end and an array of magnets coupled to a bottom surface of the body for generating a motive force on the magnetic mover. The body extends in width from a first side edge to a second side edge, in height from a product conveying surface to an opposite bottom surface and in length from a first end to a second end. The first side edge and the second side edge extend below the bottom surface to form a recessed area between the first side edge and the second side edge on the bottom surface.

According to another aspect, a mover for conveying objects comprises a first end module, an interior module, a second end module and an array of magnets coupled to the bottom surfaces of the modules. The first end module comprises a body extending in width from a first side to a second side, in height from a product conveying surface to an opposite bottom surface and in length from a first end to a second end. A first set of hinge elements extends from the first end. The interior module comprises a body extending in width from a first side to a second side, in height from a product conveying surface to an opposite bottom surface and in length from a first end to a second end. A second set of hinge elements extends from the first end for mating with the first set of hinge elements and a third set of hinge elements extends from the second end. The second end module comprises a body extending in width from a first side to a second side, in height from a product conveying surface to an opposite bottom surface and in length from a first end to a second end, the second end module further comprising a fourth set of hinge elements extending from the first end for mating with a set of hinge elements on an interior module.

According to another aspect, a mover for conveying objects comprises a plurality of hingedly connected modules, each module extending in width from a first side to a second side, in thickness from a product-carrying surface to an opposite bottom surface and in length from a first end to a second end and an array of magnets coupled to the bottom surface of the modules.

According to another aspect, a conveying system comprises a stator carryway comprising XY coils with Hall sensors encapsulated in plastic and a mover comprising a plurality of hingedly connected modules and an array of sensors coupled to a bottom surface of the mover for interacting with the XY coils.

DETAILED DESCRIPTION

A magnetic mover in a conveying system comprises a series of hingedly connected modules to allow articulation of the mover along a curved path. The invention will be described relative to certain illustrative embodiments, though those skilled in the art will recognize that the invention is not limited to the illustrative embodiments.

Figure 1:
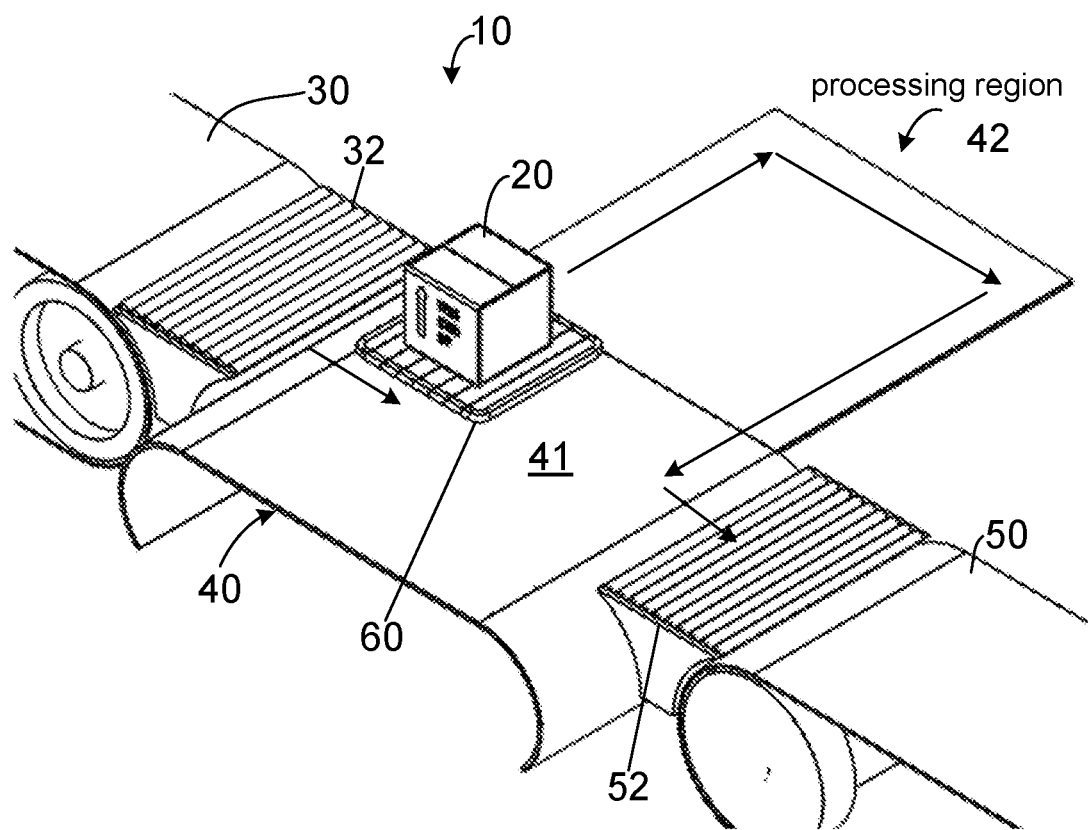
FIG. 1 is an isometric top view of a conveying system including a hinged magnetic mover according to an embodiment.

One version of a conveying system 10 embodying features of the invention is shown in FIG. 1. The conveying system 10 conveys product 20 from a first product conveyor 30 to a transfer region 40. In the transfer region 40, the product 20 is carried by a mover 60. From the transfer region 40, the product 20 can be switched to a different path, for example, undergo a process in a processing region 42, and—or continue to a second product conveyor 50. Product can be transferred off the mover 60 to the second product conveyor 50 for further conveyance. Transfer plates 32, 52 facilitate transfer of the product between the product conveyors and transfer region. After transferring product to the second product conveyor 50, the mover 60 may be removed, cleaned and—or returned to a starting position where it can again receive product 20 from the first product conveyor 30.

The illustrative product conveyors 30, 50 comprise endless conveyor belts trained around reversing elements at an infeed and outfeed end, but the invention is not so limited.

The transfer region 40 forms a carryway 41 comprising a stator that houses stator coils capable of interacting with magnets in the mover 60 to propel the mover along a selected path. The illustrative stator is constructed of XY coils with Hall sensors encapsulated in plastic, but the invention is not so limited. The mover 60 includes an array of magnets that interact with the magnetic field formed by the XY coils in the stator 41 to levitate and translate and—or otherwise move the mover 60 along a selected path. The illustrative mover 60 is a low-profile, four-sided rectangular prism, with a flat upper article-carrying surface and a magnet-housing surface on the bottom opposite the article-conveying surface. The mover is substantially flat and relatively thin in height.

Figure 2:
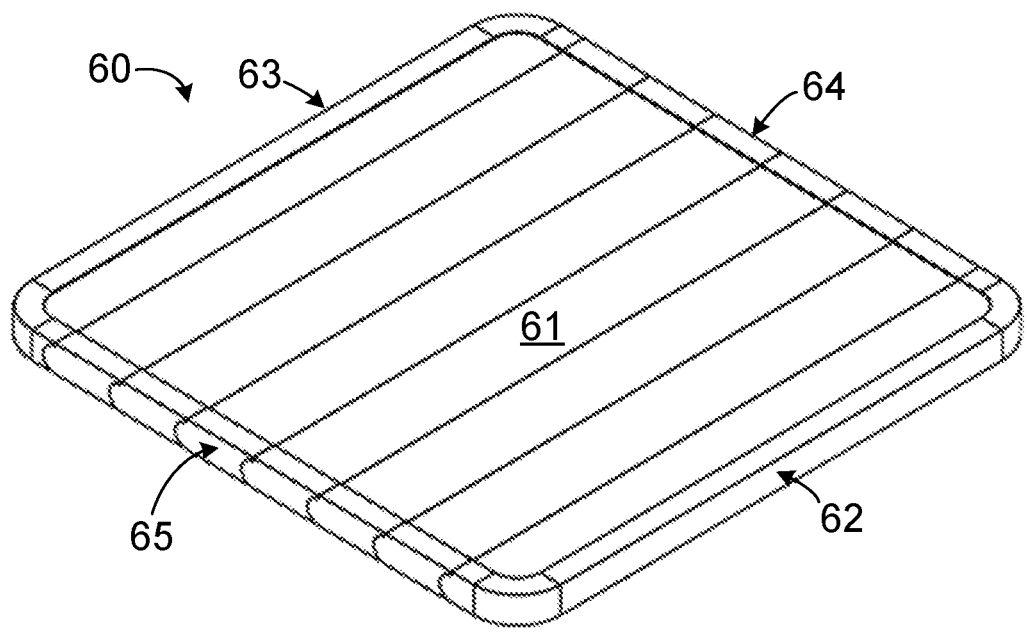
FIG. 2 is an isometric top view of a hinged magnetic mover suitable for conveying product according to an embodiment.
Figure 3:
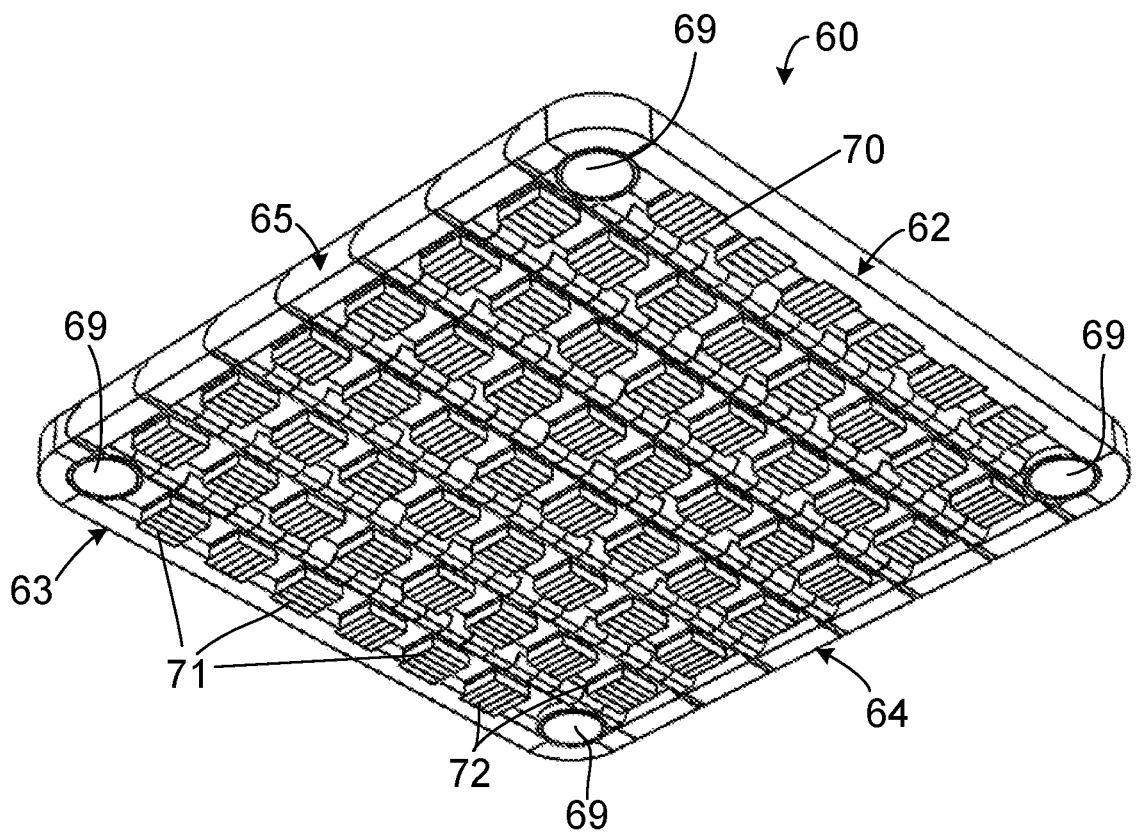
FIG. 3 is an isometric bottom view of the hinged magnetic mover of FIG. 2.

Referring to FIGS. 2-3, the illustrative mover 60 comprises a plurality of hingedly connected modules incorporating an array of permanent magnets, shown as Y magnets 71 and X magnets 72 in an alternating arrangement, on a bottom surface 70 thereof. A top surface 61 of the mover forms an article-supporting surface opposite the bottom surface 70. The mover 60 extends in length from a first end 62 to a second end 63 and in width from a first side 64 to a second side 65. The length and width of the mover 60 are much greater than the thickness of the mover from top to bottom.

In one embodiment, the mover 60 includes disc-shaped levitation magnets 69 in the corners of the mover to facilitate levitation. Alternatively, the X magnets 72 and Y magnets 71 can both levitate and translate the mover.

Figure 4:
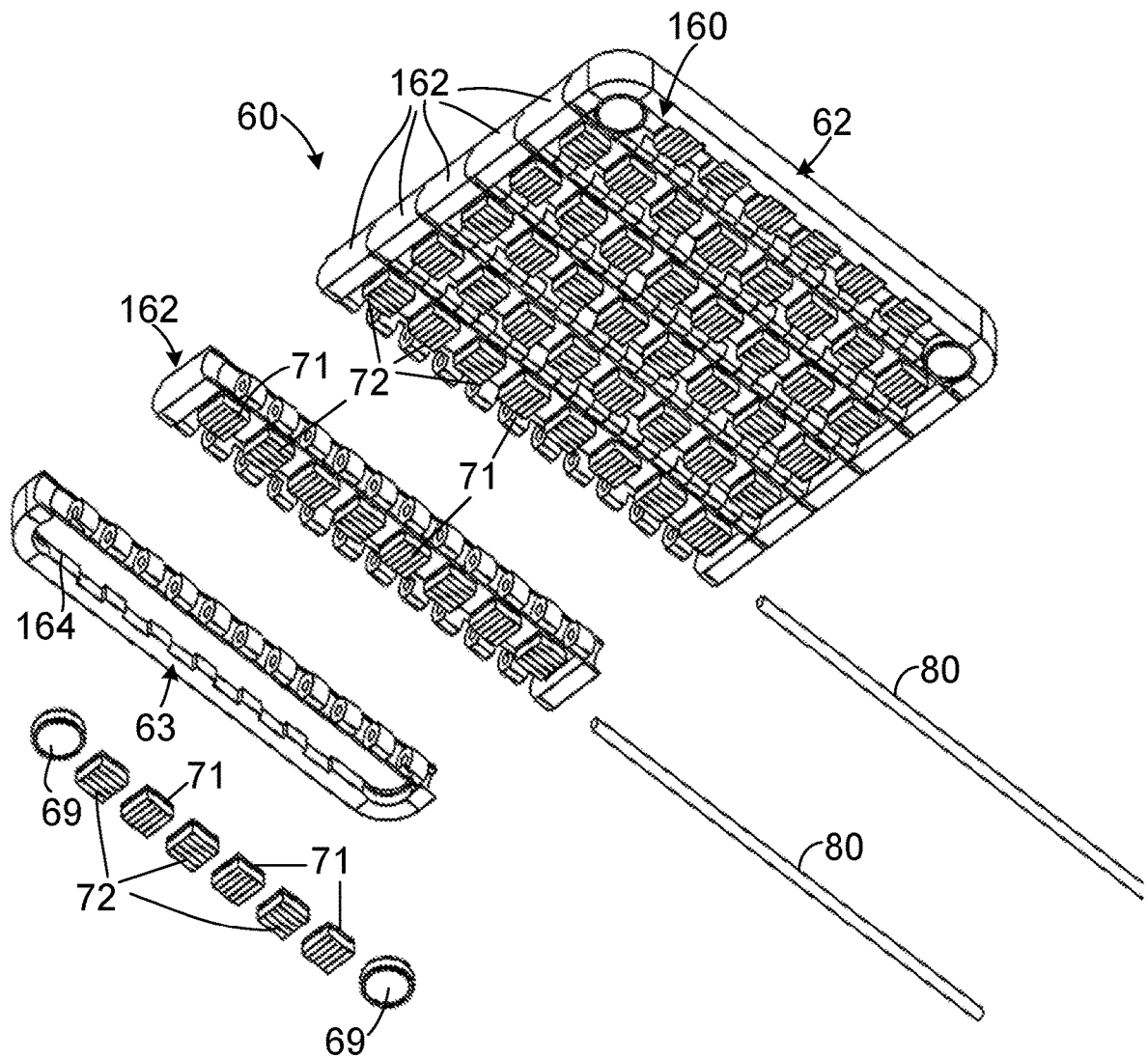
FIG. 4 is a bottom exploded view of the hinged magnetic mover of FIG. 2.

As shown in FIG. 4, the illustrative mover 60 comprises a first end module 160 forming the front edge 62 of the mover, a series of interior modules 162 hingedly connected to each other and the first end module 160, and a second end module 164 forming the rear edge 63 of the mover and hingedly connected to an interior module. The series of modules 160, 162, 164 are connected by hinge rods 80, which are inserted through interleaved sets of hinge elements on adjacent modules to hingedly connect the modules together, while allowing articulation of the modules relative to each other.

Figure 5:
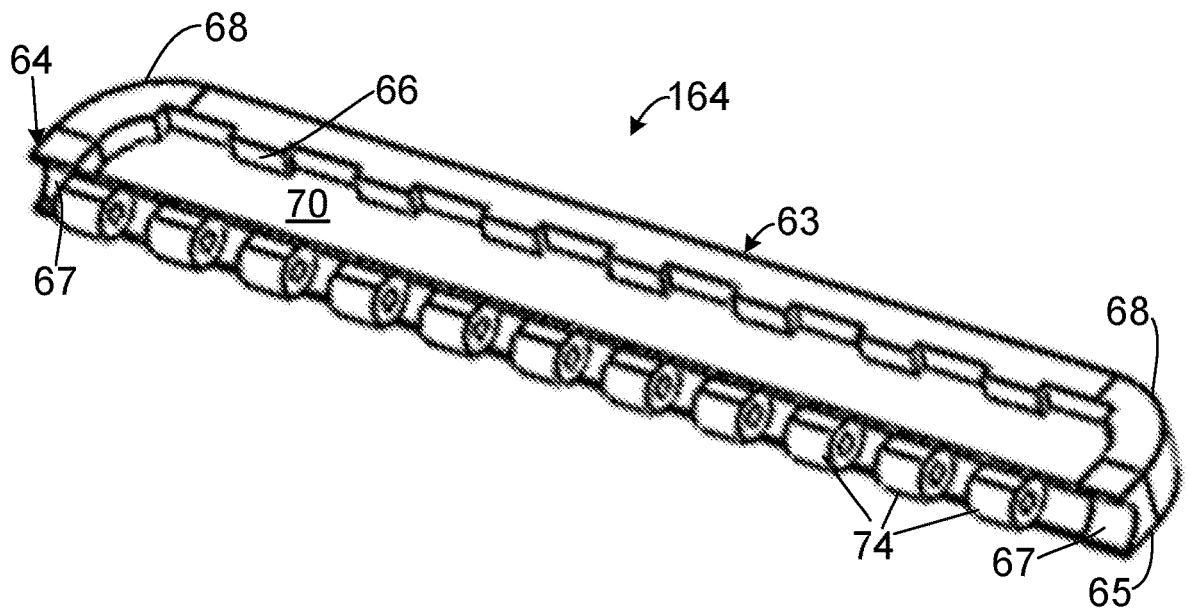
FIG. 5 is an isometric bottom view of an end module of the hinged magnetic mover of FIG. 2.

FIG. 5 is a bottom view of an end module 164 suitable for forming a mover 60. The illustrative end module 164 comprises a module body extending in length from a first edge 63, which forms the second end of the mover, to an inner edge 67, and in width from a first side 64 to a second side 65. A top surface (not shown) forms part of the top article-supporting surface 61, and a bottom surface 70 is configured to house a portion of the magnet array. In the illustrative embodiment, each module houses a row of the magnetic array, but the invention is not so limited. In the illustrative embodiment, curved corners 68 connect the side edges 64, 65 to the first edge 63, but the invention is not so limited. A series of spaced-apart hinge elements 74 extend from the inner edge 67 for joining the end module 164 to an interior module 162. The illustrative inner edge 67 is rounded, as are the radial surfaces of the hinge elements 74 to allow articulation of the modules 160, 162, 164 relative to each other. The illustrative inner edge 67 forms a concave curve. In the illustrative embodiment, the first edge 63, rounded corners 68 and side edges 64, 65 extend below the bottom surface 70 of the module body, so that the bottom surface 70 is recessed relative to the edges 63, 64, 65, 68.

The inner border 66 of the first edge 63 may be castellated to form recesses for seating the magnets 71, 72. The first edge 63 may have any suitable shape for allowing the module to incorporate the magnets, 71, 72, which may have any suitable size, shape and—or configuration. In one embodiment, the magnets 71, 72 are polymagnets for increased strength.

Figure 6:
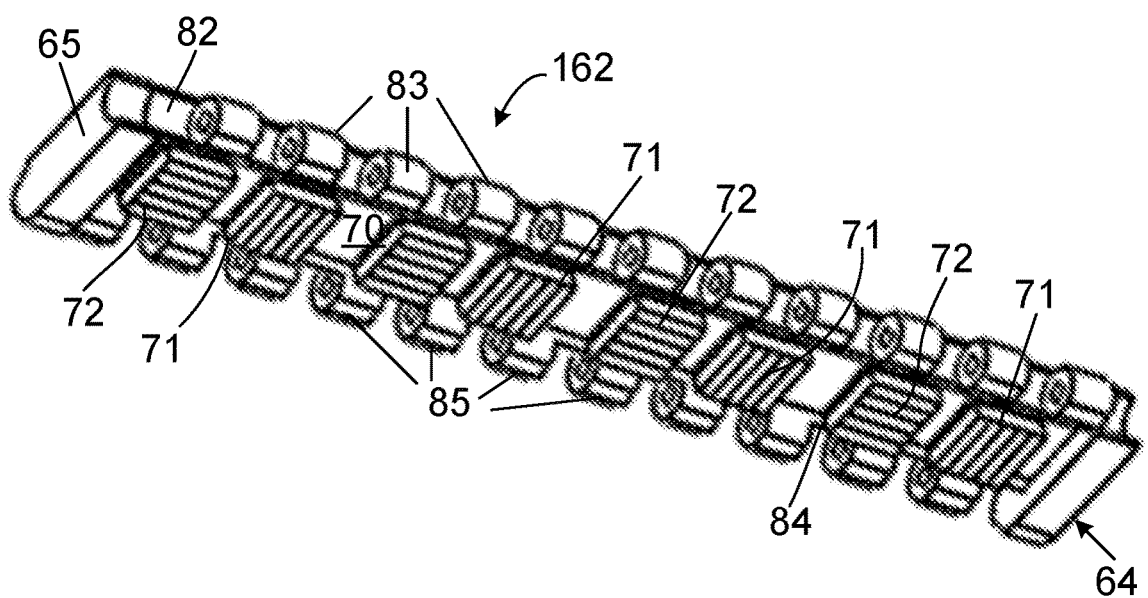
FIG. 6 is an isometric bottom view of an interior module of the hinged magnetic mover of FIG. 2.

Referring to FIG. 6, an interior mover module 162 comprises a body extending in length from a first end 82 to a second end 84, in width from a first side edge 64 to a second side edge 65 and in depth from a top surface (not shown), forming part of the article-supporting top surface 61 of the mover, to a bottom surface 70. A series of spaced-apart hinge elements 83 extend from the first end 82 and a series of spaced-apart hinge elements 85, offset from the hinge elements 83, extend from the second end 84. The hinge elements 85 are offset from the hinge elements 74 of the end module 164, to allow the hinge elements 85, 74 to interleave to form a hinge passageway for receiving a hinge rod 80 to connect the modules 162, 164 together.

The hinge elements 85 have curved radial surfaces to interface with the curved, concave inner edge 67 of the end module 164. The side edges 64, 65 of the interior module 162 extend beyond the second end 84 to align with the hinge elements 85, with the front ends of the side edges 64, 65 concavely curved and coinciding with the first end 82 and the rear ends of the side edges 64, 65 convexly curved to match the outer surface of the hinge elements 85 and interface with the inner edge 67 of the end module 164.

The first end 82 is concavely curved to interface with the curved radial surfaces of hinge elements 85 of an adjacent interior mover module 162.

The side edges 64, 65 extend below the bottom surface 70 of the interior module 162, so that the bottom surface 70 is recessed from the side edges 64, 65. A row of alternating Y magnets 71 and X magnets 72 are coupled to the bottom surface 70 to form a row of the magnet array on the complete mover 60.

The other end module 160 is configured to interface with an interior module 162 and includes a solid front edge 62 to complete the mover 60. A plurality of interior modules 162 may be hingedly connected in series, with an end module 160 or 164 hingedly connected to each end of the series to form a complete mover 60.

In one embodiment, the edges 62, 63, 64, 65 of the mover 60 have top surfaces that form a continuation of the article-carrying surface 61. In another embodiment, article-carrying surface 61 may be recessed relative to the edges 62, 63, 64, 65 or otherwise shaped to facilitate conveyance of articles.

In one embodiment, the modules 160, 162, 164 are formed of injection molded plastic, with the magnets 70, 71 affixed separately to the bottom surface. Alternatively, the magnets 70, 71 may be encapsulated in the body of the modules. The magnets 70, 71 can be made of metal or ceramics, but can also be made of plastic magnet material as are refrigerator magnets, for example.

In one embodiment, the edges 62, 63, 64, 65, 68 may be formed of a different material than the body and—or hinge elements of the modules 160, 162, 164. For example, the side edges can be polyurethane while the body may be formed of acetal.

Figure 7:
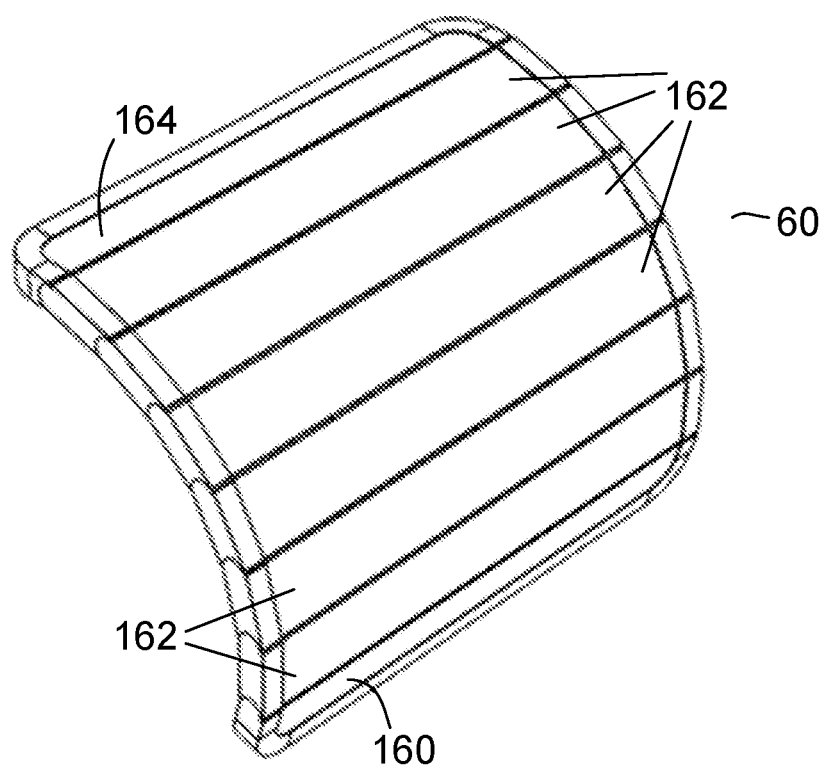
FIG. 7 is an isometric view of the hinged magnetic mover in a curved form.

As shown in FIG. 7, a mover 60 formed by hingedly connecting a plurality of end modules 160, 164 and interior modules 162 can curve inwards to follow a curved path, for example at a transfer point.

Figure 8:
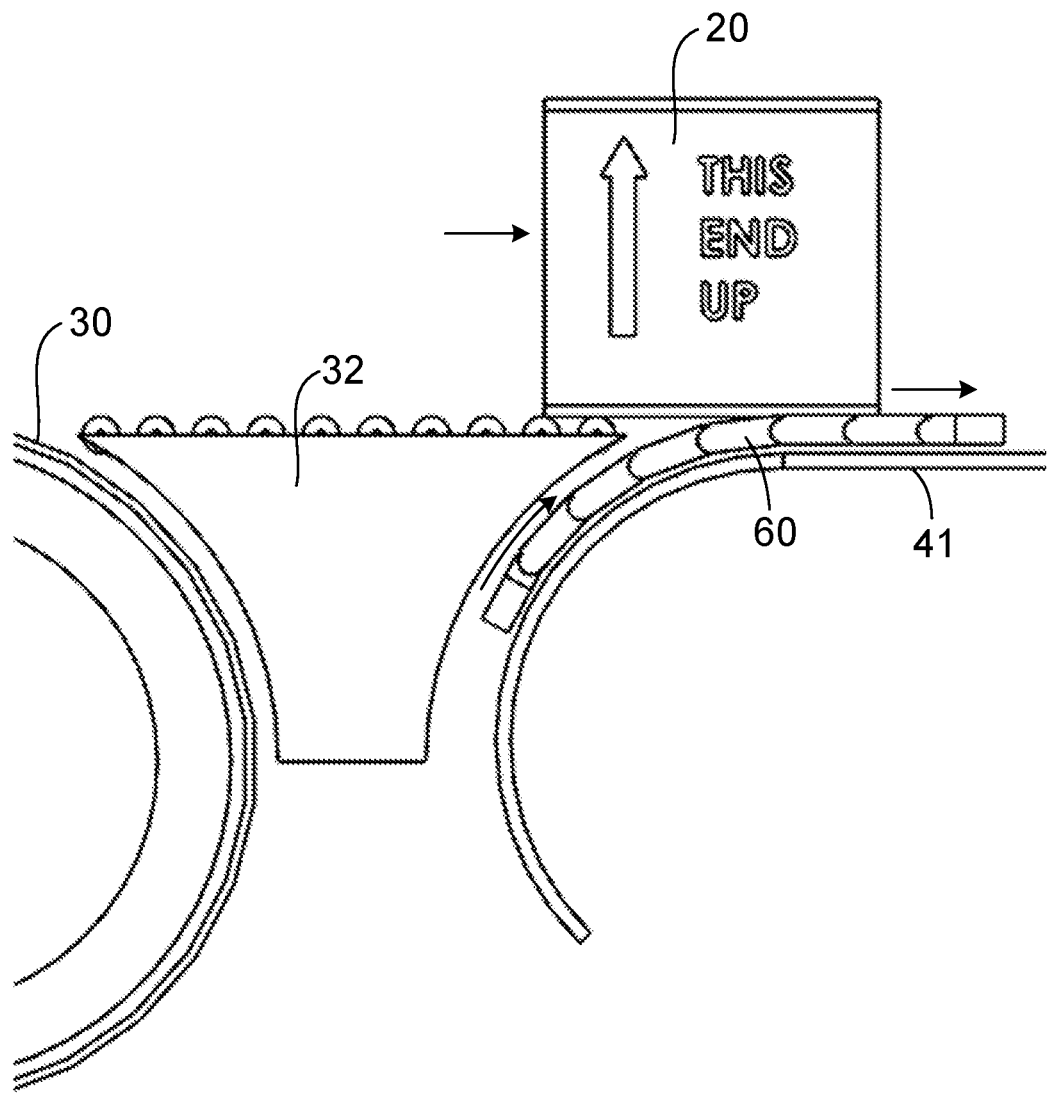
FIG. 8 shows the conveying system of FIG. 1 during transfer of a product from a transfer plate to a hinged magnetic mover.

As shown in FIG. 8, the modular mover 60 can facilitate transfer of a product to and—or from a conveyor. FIG. 8 shows the transfer of a product 20 from a conveyor 30 to a carryway 41 forming a stator via an intermediate transfer plate 32. As the product 20 moves over the transfer plate 32, a hingedly connected, modular mover 60 can move forward over a curved surface at the end of the stator carryway 41 between the stator carryway and transfer plate 32. As the product 20 exits the transfer plate 32, the mover 60 can be in place to receive the product from the transfer plate 32, ensuring a smooth transition. Product can be transferred from a modular mover 60 to a transfer plate 32 or other device in a reverse process, whereby the mover 60 curves below the transfer plate 32 as it transfers product from the carryway 41 to the transfer plate 32.

In one embodiment, a modular, hingedly connected mover 60 could return through the conveyor returnway like a conventional conveyor. In another embodiment, the mover 60 translates to another location to pick up another product without passing through the conveyor returnway.

Figure 9:
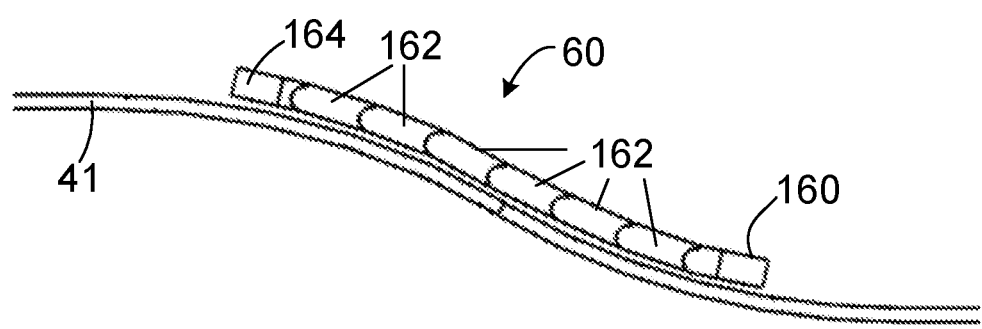
FIG. 9 shows a hinged magnetic mover navigating a backbent carryway according to an embodiment.

As shown in FIG. 9, a mover 60 formed by a plurality of hingedly connected modules 160, 162, 164 housing magnets can also backbend to follow a curved path formed by a carryway 41 including an integrated stator to enable elevation changes. For example, a pool of liquid, such as oil, water or another suitable liquid, can be formed at a lower elevation in a carryway 41. A mover 60 can be submerged in the pool for cooking, rinsing, washing or for another suitable application, then moved back to the higher elevation for another application.

Figure 10:
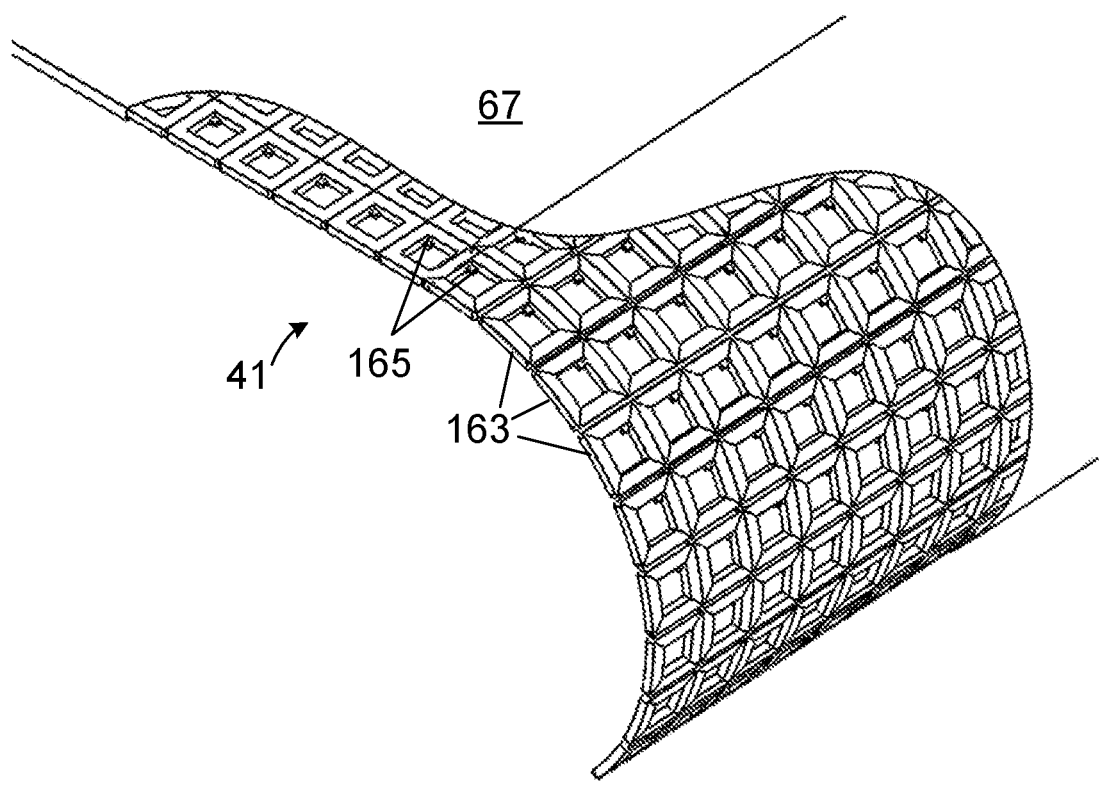
FIG. 10 is a detailed view of a stator carryway suitable for translating and levitating a hinged magnetic mover of an embodiment of the invention.
Figure 11:
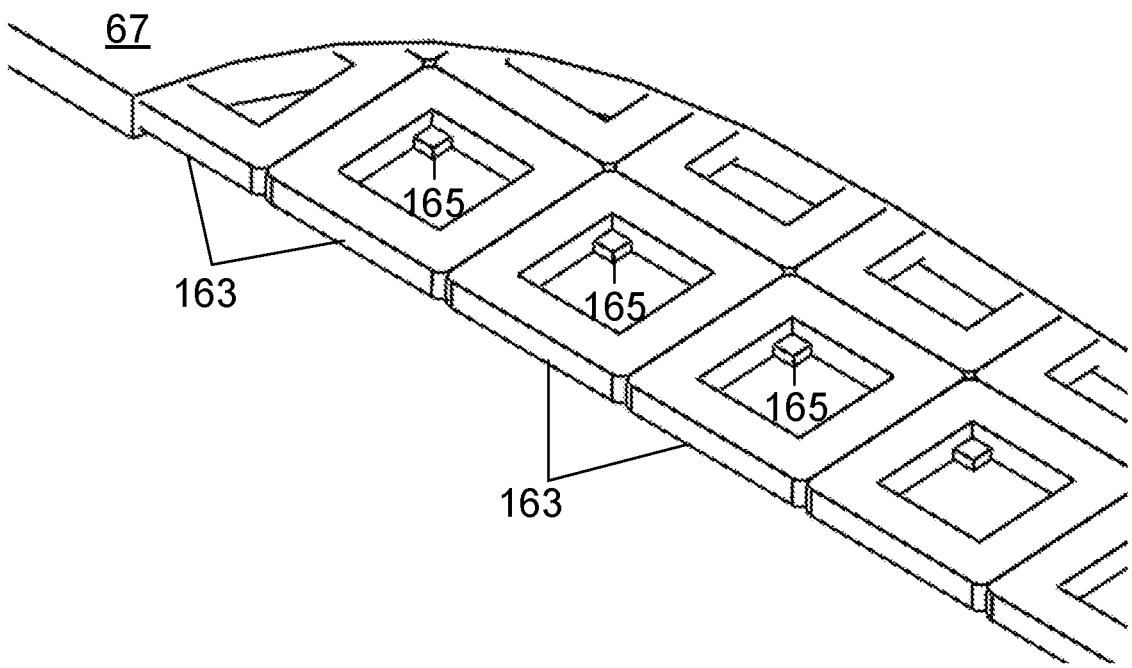
FIG. 11 is a detailed view of the stator of FIG. 10.

Referring to FIGS. 10 and 11, in one embodiment, the stator carryway 41 for inducing movement in the mover 60 comprises XY coils 163 with Hall sensors 165 encapsulated in plastic 67 or another suitable material. As shown, the carryway 41 can be curved to direct the articulatable, modular mover to a different elevation and—or shape.

Figure 12:
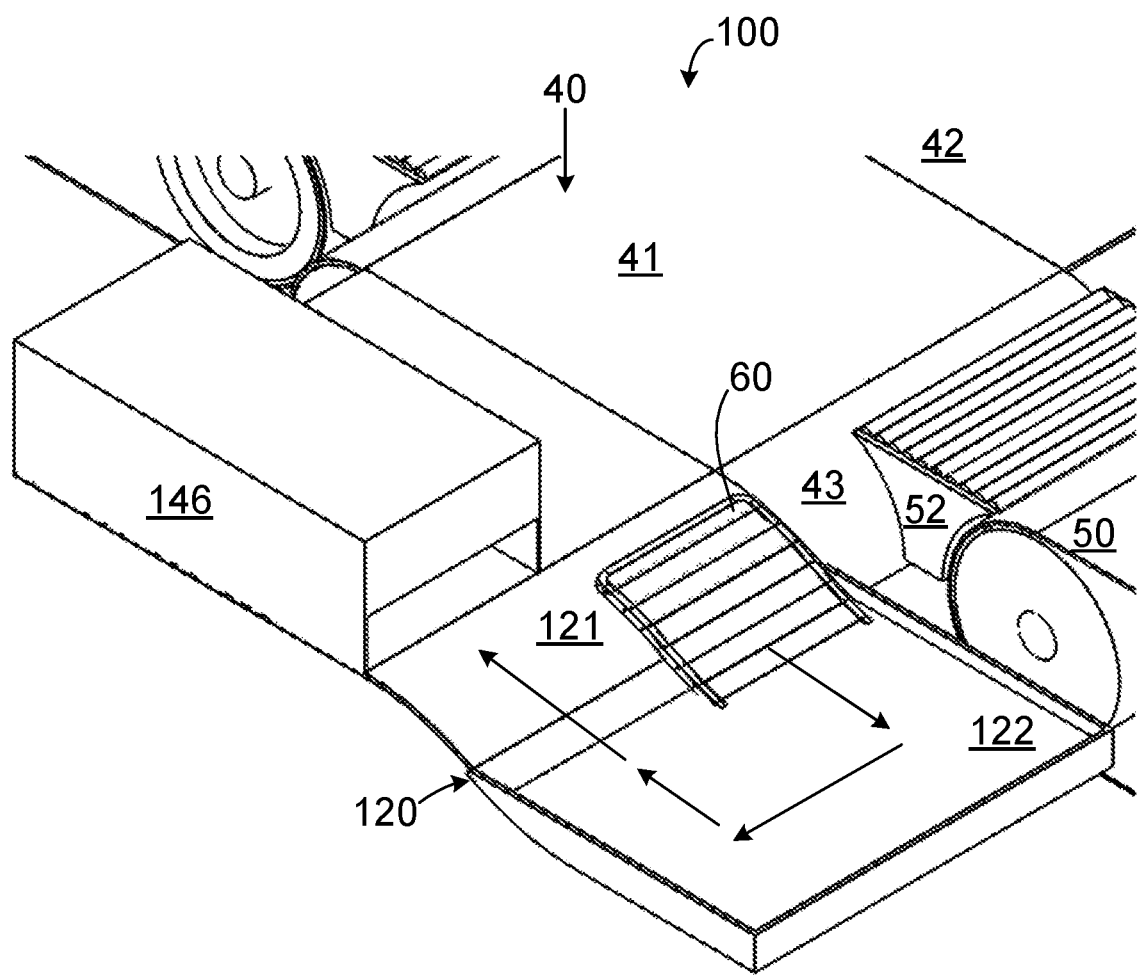
FIG. 12 is an isometric view of a conveyor system with an integrated cleaning station for a hinged magnetic mover according to an embodiment.

FIG. 12 shows an embodiment of a conveyor system 100 with integrated cleaning station 120 for an articulatable hingedly-connected magnetic mover 60. In the embodiment of FIG. 12, the conveyor system 100 includes a transfer region 40 comprising a carryway stator 41 that moves the hinged magnetic mover 60 through a process in a processing region 42. After offloading the product onto a second product conveyor 50 via a transfer plate 52, during which the mover 60 flexes to a fit in between a space between the curved end 43 of the carryway 41 and the transfer plate 52, the mover 60 can reverse back to the main portion of the carryway stator 41, then translate over to the cleaning station 120. The mover 60 can then move down a ramp 121 to enter a pool 122 of cleaning fluid for cleaning. If necessary, the mover 60 can backbend to accommodate the shape of the ramp 121. The mover 60 can translate through the pool 122 to clean the mover, then the mover 60 can move up the ramp 121 and into a dryer 146, which dries the mover 60. After drying, the mover 60 can return to the transfer region 40 to receive another product for processing.

Figure 13:
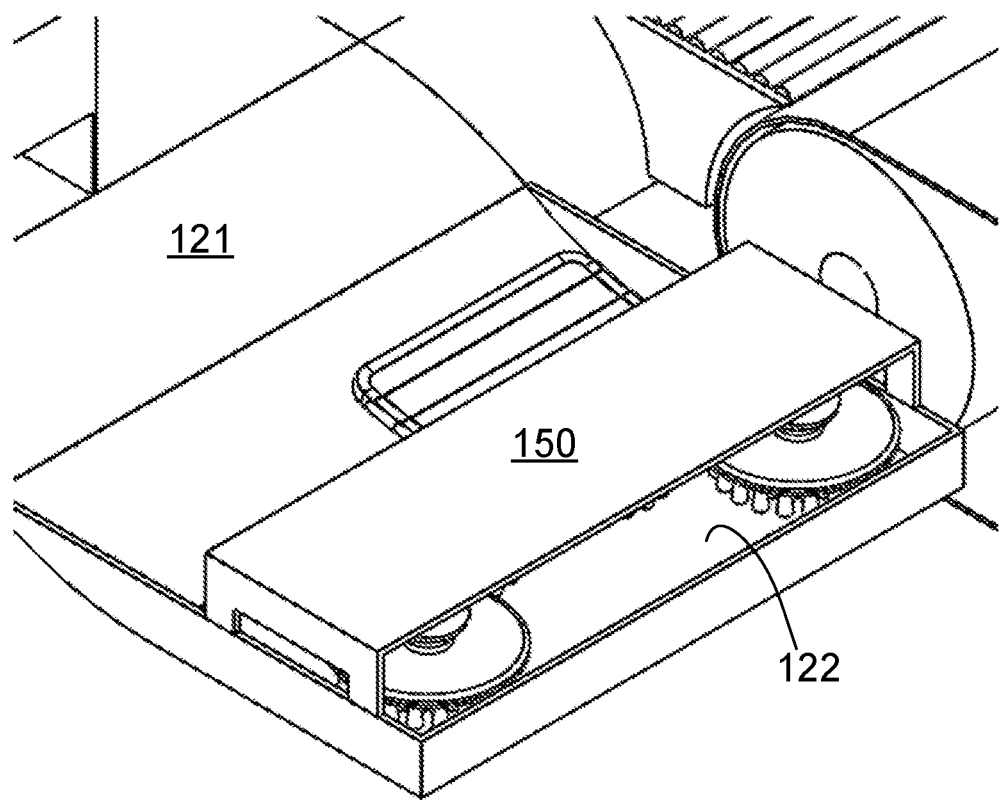
FIG. 13 shows the cleaning station of FIG. 12 with a scrubbing brush for cleaning the hinged magnetic mover.
Figure 14:
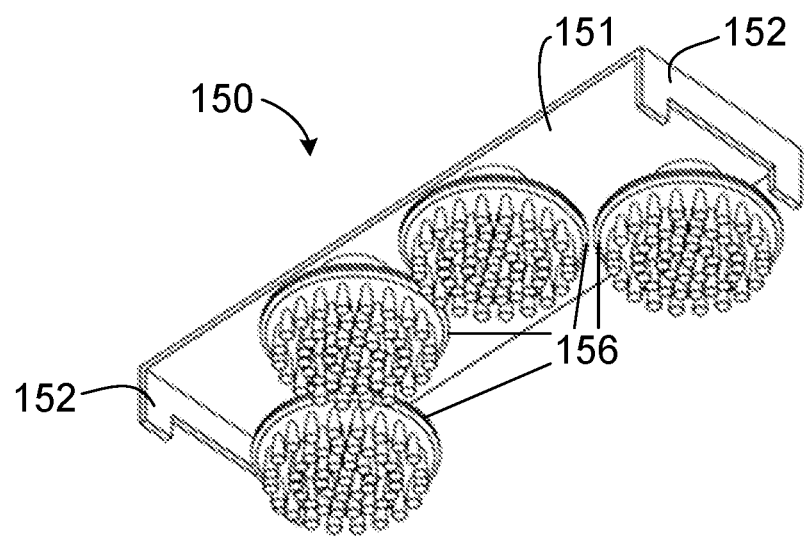
FIG. 14 is a bottom view of the scrubbing brush of FIG. 13.

In one embodiment, shown in FIG. 13, the pool 122 may include a scrubber 150 to facilitate cleaning of the mover 60. As shown in FIG. 14, the illustrative scrubber 150 comprises a base 151 that laterally spans the pool 122. Side walls 152 extends down from the base 151 and rest on the walls of the pool 122 to position the scrubber 150. Rotating brushes 156 with an array of cleaning bristles extend from the bottom surface of the base 151 for scrubbing the surface of the mover 60. The rotating brushes 156 may be motorized.

Any suitable means for cleaning a mover 60 may be used.

Although features of the invention have been described with respect to various versions, other versions are possible. The scope of the claims is not meant to be limited to the specific versions used in this description.

What is claimed is:

1. A module for a forming a magnetic mover in a magnetic levitation system, comprising:
a body extending in width from a first side edge to a second side edge, in height from a product conveying surface to an opposite bottom surface and in length from a first end to a second end, wherein the first side edge and the second side edge extend below the bottom surface to form a recessed area between the first side edge and the second side edge on the bottom surface;
a first set of hinge elements extending from the first end; and
an array of magnets coupled to the bottom surface for generating a motive force on the magnetic mover.

2. The module of claim 1, wherein the first end has a concave shape.

3. The module of claim 2, wherein the second end has a convex shape complementary to the first end.

4. The module of claim 3, further comprising a second set of hinge elements extending from the second end.

5. The module of claim 1, wherein the array of magnets comprises a row of Y magnets alternating with X magnets.

6. The module of claim 1, wherein the second end extends below the bottom surface to define an end of the recessed area.

7. The module of claim 6, wherein the second end forms a castellated edge on the bottom surface for seating the array of magnets.

8. The module of claim 1, wherein the array of magnets comprises a first set of magnets for translating the magnetic mover and a second set of magnets for levitating the magnetic mover.

9. A mover for conveying objects, comprising:
a first end module comprising a body extending in width from a first side to a second side, in height from a product conveying surface to an opposite bottom surface and in length from a first end to a second end, the first end module further comprising a first set of hinge elements extending from the first end;
an interior module comprising a body extending in width from a first side to a second side, in height from a product conveying surface to an opposite bottom surface and in length from a first end to a second end, the interior module further comprising a second set of hinge elements extending from the first end for mating with the first set of hinge elements and a third set of hinge elements extending from the second end;
a second end module comprising a body extending in width from a first side to a second side, in height from a product conveying surface to an opposite bottom surface and in length from a first end to a second end, the second end module further comprising a fourth set of hinge elements extending from the first end for mating with a set of hinge elements on an interior module; and
an array of magnets coupled to the bottom surfaces of the modules.

10. The mover of claim 9, wherein the array of magnets comprises a first set of magnets for translating the magnetic mover and a second set of magnets for levitating the magnetic mover.

11. The mover of claim 9, further comprising a plurality of hinge rods inserted through the hinge elements to connect the modules.

12. The mover of claim 9, wherein the bottom surfaces of the modules are recessed from the sides forming edges of the modules.

13. A mover for conveying objects, comprising:
- a plurality of hingedly connected modules forming a four-sided rectangular prism having a first edge, a second edge, a third edge and a fourth edge, each module extending in width from a first side to a second side, in thickness from a product-carrying surface to an opposite bottom surface and in length from a first end to a second end; and
- an array of magnets coupled to the bottom surface of the modules, wherein the first edge, second edge, third edge and fourth edge extend below the bottom surface to form a recessed area for housing the magnets.

14. The mover of claim 13, wherein the array of magnets comprises a row of X magnets alternating with Y magnets coupled to the bottom surface of each module.

15. A conveying system, comprising:
- a stator carryway comprising XY coils with Hall sensors encapsulated in plastic; and
- a mover comprising a plurality of hingedly connected modules and an array of magnets coupled to a bottom surface of the mover for interacting with the XY coils.

16. The conveying system of claim 15, wherein the stator includes first section at a first elevation and a second section at a lower elevation, the second section filled with a liquid, through which the mover can move.

17. The conveying system of claim 16, further comprising a scrubbing brush for cleaning the mover in the second section.

18. The conveying system of claim 15, wherein the stator includes a curved section, about which the mover can articulate.

19. The conveying system of claim 15, wherein the array of magnets comprises a row of X magnets alternating with Y magnets coupled to the bottom surface of each module of the mover.

* * * * *